(12) United States Patent
Atanassova et al.

(10) Patent No.: US 9,281,520 B2
(45) Date of Patent: *Mar. 8, 2016

(54) LEAD-ACID BATTERIES AND PASTES THEREFOR

(75) Inventors: Paolina Atanassova, Albuquerque, NM (US); Yipeng Sun, Albuquerque, NM (US); Berislav Blizanac, Albuquerque, NM (US); Toivo Kodos, Billerica, MA (US); Mark J. Hampden-Smith, Albuquerque, NM (US); Miodrag Oljaca, Albuquerque, NM (US)

(73) Assignee: Cabot Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/435,027

(22) Filed: Mar. 30, 2012

(65) Prior Publication Data

US 2012/0248383 A1    Oct. 4, 2012

Related U.S. Application Data

(60) Provisional application No. 61/471,280, filed on Apr. 4, 2011.

(51) Int. Cl.

| H01B 1/04 | (2006.01) |
| H01M 4/56 | (2006.01) |
| H01M 4/20 | (2006.01) |
| H01M 4/62 | (2006.01) |
| H01M 10/06 | (2006.01) |

(52) U.S. Cl.
CPC ......... *H01M 4/56* (2013.01); *H01M 4/20* (2013.01); *H01M 4/627* (2013.01); *H01B 1/04* (2013.01); *H01M 10/06* (2013.01); *Y02E 60/126* (2013.01)

(58) Field of Classification Search
CPC ................................................ H01B 1/04
USPC ........................................................ 252/502
See application file for complete search history.

(56) References Cited

U.S. PATENT DOCUMENTS

| 4,053,695 A | * 10/1977 | Peters et al. ................. 429/225 |
| 4,189,532 A | 2/1980 | Golz |
| 5,223,352 A | 6/1993 | Pitts et al. |
| 5,395,406 A | * 3/1995 | Clavenna et al. ............ 48/198.7 |
| 5,547,783 A | 8/1996 | Funato et al. |
| 5,885,335 A | 3/1999 | Adams et al. |
| 6,338,809 B1 | 1/2002 | Hampden-Smith et al. |
| 6,511,771 B1 | 1/2003 | Clough |
| 6,601,776 B1 | 8/2003 | Oljaca et al. |

(Continued)

FOREIGN PATENT DOCUMENTS

| CN | 101937991 A | 1/2011 |
| EP | 2262042 A1 | 12/2010 |
| JP | 09147841 | * 6/1997 |

OTHER PUBLICATIONS

JP-09147981, pub. Jun. 1997. Machine translation.*

(Continued)

*Primary Examiner* — Mark Kopec
*Assistant Examiner* — William Young

(57) ABSTRACT

A paste suitable for a negative plate of a lead-acid battery comprises at least (a) a lead-based active material and an expander mixture comprising (b) carbon, (c) barium sulfate and (d) a lignosulfonate, wherein at least part of at least two of said components (a) to (d) are present in the paste as composite particles.

15 Claims, 7 Drawing Sheets

(56) References Cited

U.S. PATENT DOCUMENTS

| | | |
|---|---|---|
| 6,740,452 B2 | 5/2004 | Ma |
| 2004/0180264 A1 | 9/2004 | Hondo et al. |
| 2008/0305396 A1* | 12/2008 | Boden .................. 429/231.4 |
| 2009/0117467 A1 | 5/2009 | Zhamu et al. |
| 2009/0325068 A1 | 12/2009 | Boden et al. |
| 2010/0051857 A1* | 3/2010 | Takakusa et al. .......... 252/182.1 |
| 2011/0020693 A1* | 1/2011 | Hoshiba .................. 429/152 |

OTHER PUBLICATIONS

Wang et al., Chemical Engineering Journal 149 (2009) pp. 473-478.

International Search Report and Written Opinion for International Application No. PCT/US2012/031850 mailed Apr. 2, 2012.

Supplementay European Search Report for International Application No. PCT/US2012/031850 mailed Oct. 13, 2014 from the European Patent Office.

* cited by examiner

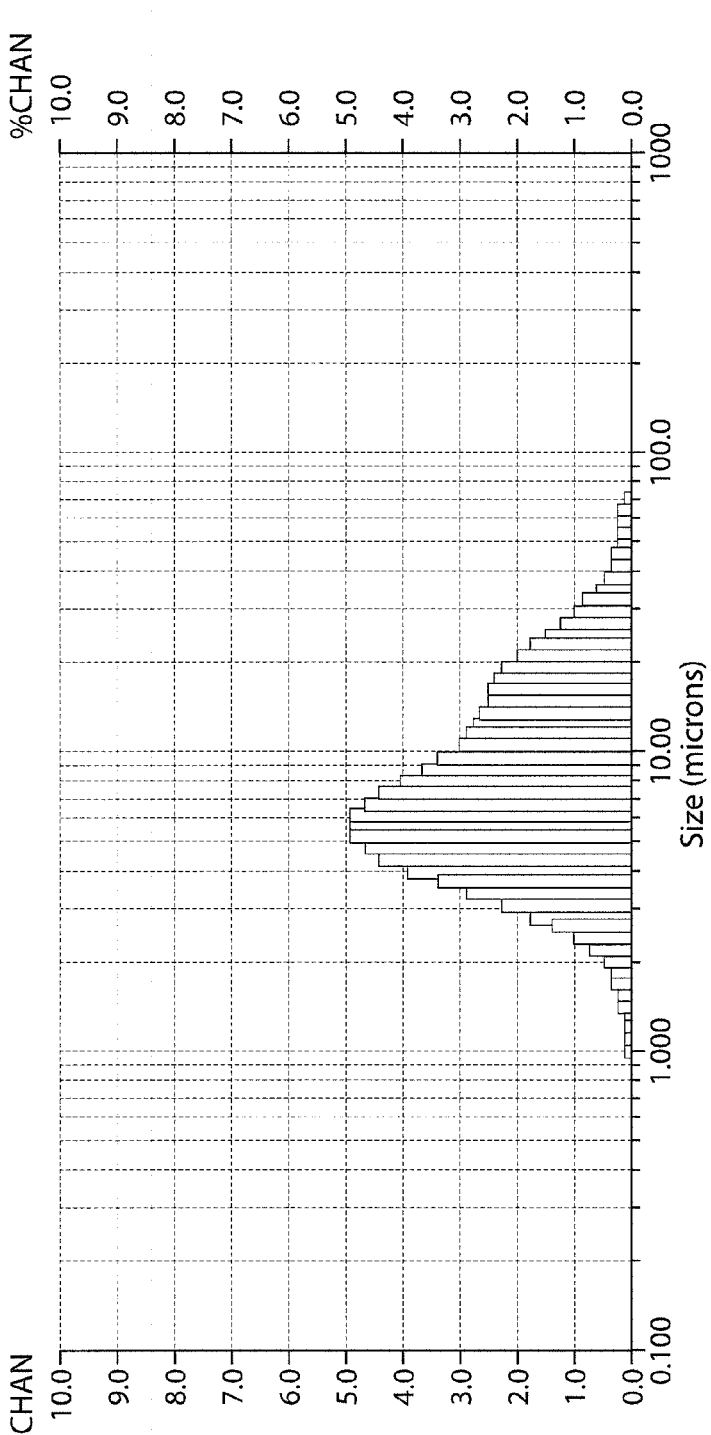

LEAD-ACID BATTERIES AND PASTES THEREFOR

CROSS-REFERENCE TO RELATED APPLICATIONS

This patent application claims the benefit of U.S. Provisional Patent Application No. 61/471,280, filed Apr. 4, 2011, which is incorporated in its entirety by reference herein.

FIELD

The present invention relates to lead-acid batteries and pastes for use in forming lead-acid battery plates, particularly negative lead-acid battery plates.

BACKGROUND

The lead-acid battery is an electrochemical storage battery generally comprising a positive plate, a negative plate, and an electrolyte comprising aqueous sulfuric acid. The plates are held in a parallel orientation and electrically isolated by porous separators to allow free movement of charged ions. The positive battery plates contain a current collector (i.e., a metal plate or grid) covered with a layer of positive, electrically conductive lead dioxide ($PbO_2$) on the surface. The negative battery plates contain a current collector covered with a negative, active material, which is typically lead (Pb) metal.

During discharge cycles, lead metal (Pb) supplied by the negative plate reacts with the ionized sulfuric acid electrolyte to form lead sulfate ($PbSO_4$) on the surface of the negative plate, while the $PbO_2$ located on the positive plate is converted into $PbSO_4$ on or near the positive plate. During charging cycles (via an electron supply from an external electrical current), $PbSO_4$ on the surface of the negative plate is converted back to Pb metal, and $PbSO_4$ on the surface of the positive plate is converted back to $PbO_2$. In effect, a charging cycle converts $PbSO_4$ into Pb metal and $PbO_2$; a discharge cycle releases the stored electrical potential by converting $PbO_2$ and Pb metal back into $PbSO_4$.

Lead-acid batteries are currently produced in flooded cell and valve regulated configurations. In flooded cell batteries, the electrodes/plates are immersed in electrolyte and gases created during charging are vented to the atmosphere. Valve regulated lead-acid batteries (VRLA) include a one-way valve which prevents external gases entering the battery but allows internal gases, such as oxygen generated during charging, to escape if internal pressure exceeds a certain threshold. In VRLA batteries, the electrolyte is normally immobilized either by absorption of the electrolyte into a glass mat separator or by gelling the sulfuric acid with silica particles.

Currently the negative plates of lead-acid batteries are produced by applying a paste of micron size lead oxide ($PbO_2$) powder in sulfuric acid to electrically conducting lead alloy structures known as grids. Once the plates have been cured and dried, they can be assembled into a battery and charged to convert the $PbO_2$ to Pb sponge. As indicated in, for example, U.S. Patent Application Publication No. 2009/0325068, it is normal to add an expander mixture to the lead oxide/sulfuric acid paste to improve the performance of the final negative electrode. The expander mixture typically comprises (a) barium sulfate to act as a nucleating agent for lead sulfate produced when the plate is discharged, (b) carbon to increase the electrical conductivity of the active material in the discharged state and (c) a lignosulfonate or other organic material to increase the surface area of the active material and to assist in stabilizing the physical structure of the active material.

U.S. Patent Application Publication No. 2004/0180264 discloses a lead-acid battery comprising an anode, a cathode and an electrolytic solution, wherein into the anode is added a carbon containing a simple substance and/or a compound, both having a catalysis for desulfurization or $SO_x$ oxidation. Suitable catalytic substances include Hf, Nb, Ta, W, Ag, Zn, Ni, Co, Mo, Cu, V, Mn, Ba, K, Cs, Rb, Sr and Na, or at least one oxide, sulfate, hydroxide or carbide thereof.

U.S. Patent Application Publication No. 2011/0020693 discloses an electrode for a lead acid battery comprising an electrode active material layer comprising a lead containing material, a porous carbon material and a binder, and a current collector, wherein when a weight of lead atom is A and a weight of porous carbon material is B, $B/(A+B)\times 100$ satisfies 1.0 to 90%; and said binder is a crystalline polymer having a melting temperature of 40° C. or less or is an amorphous polymer. The electrode active material layer comprises a layer including the lead containing material, and a layer including the porous carbon material and binder, wherein the latter is composed of spherical composite particles produced by spray drying.

U.S. Pat. No. 5,547,783 discloses a valve-regulated lead-acid battery in which the theoretical capacity (Ah) of the negative active material in the battery is less than that of the positive active material and the negative active material contains a conductive additive in the range of 0.5 weight % to 7.5 weight % of the negative active material. The conductive additive is carbon, acetylene black, polyaniline, tin powder, tin compound powder, etc. having an average particle diameter of 100μ or less.

SUMMARY

According to the invention it has now been found that significant improvements in the performance of a lead-acid battery can be achieved by adding at least two of the components of the negative plate paste, particularly the lead oxide active material and at least one of the components of expander mixture, as a composite particle. In particular, adding composite particles comprising very small (nm size) $PbO_2$ crystallites supported on high surface area carbon particles can act as nucleation sites and reduce the size of the Pb particles produced on charging the plate and hence the $PbSO_4$ crystallites produced on discharging the plate. Once these small $PbSO_4$ crystallites are formed they will require much shorter times to fully convert to Pb during charging cycles. In addition, they will be distributed on the surface of carbon support that will inhibit them from undergoing rapid sintering. The carbon support/active phase integrated particle will also ensure a pre-locked and designed porosity of the electrode layer that can be preserved for a large number of cycles. An additional benefit from this approach will be improved Pb phase utilization, which should provide an increase in the energy and power density of the lead-acid battery along with improved cycleability. Similarly, small barium sulfate particles pre-deposited on the surface of the carbon can act as a nucleating agent for lead sulfate produced when the plate is discharged.

In one aspect, the invention resides in a paste suitable for a negative plate of a lead-acid battery, the paste comprising at least (a) a lead-based active material and an expander mixture comprising (b) carbon, (c) barium sulfate and (d) a lignosulfonate, wherein at least part of at least two of said components (a) to (d) are present in the paste as composite particles.

Conveniently, the composite particles comprise agglomerates of carbon particles, especially carbon black particles, having at least part of one or more of said (a) lead-based active material, (c) barium sulfate and (d) lignosulfonate associated therewith. Generally, said carbon particle agglomerates have an average particle size, D50, of less than 200 microns, such as less than 100 microns, for example less than 10 microns. Conveniently, said carbon particle agglomerates have a bimodal particle size distribution.

In one embodiment, the composite particles comprise agglomerates of carbon particles having at least part of said lead-based active material, especially lead oxide, lead sulfate or a mixture thereof, disposed between and on the surface of the carbon particle agglomerates. Conveniently, the weight ratio of carbon to said lead-based active material in said composite particles is from about 99:1 to about 80:20.

In a further embodiment, the composite particles comprise agglomerates of carbon particles having at least part of said barium sulfate disposed between and on the surface of the carbon particle agglomerates. Conveniently, the weight ratio of carbon to barium sulfate in said composite particles is from about 90:10 to about 50:50.

In a further embodiment, the composite particles comprise agglomerates of carbon particles having at least part of said lignosulfonate disposed between and on the surface of the carbon particle agglomerates. Conveniently, the weight ratio of carbon to lignosulfonate in said composite particles is from about 90:10 to about 50:50.

In further aspects, the invention resides in a negative lead-acid battery plate and a lead-acid battery comprising the paste described herein.

DETAILED DESCRIPTION OF THE EMBODIMENTS

Figure 1B:
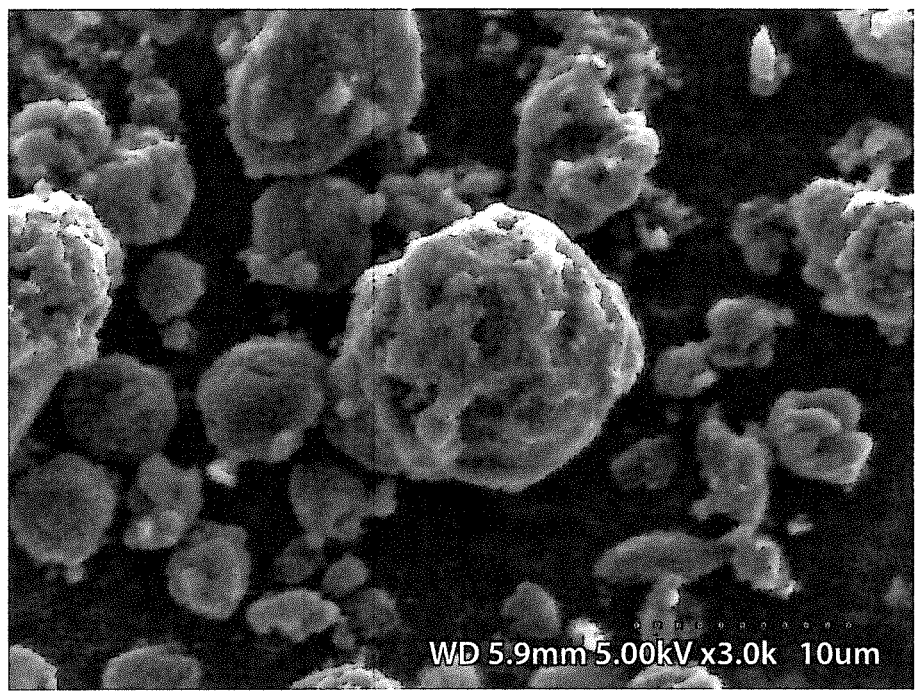
FIGS. 1(a) and (b) are a particle size distribution graph and a scanning electron micrograph (SEM at a magnification of 3000×) of the carbon black sample of Example 1 ($D_{50}$=7.1 microns).

The manufacture of battery plates for lead-acid batteries generally involves a paste mixing, curing and drying operation in which the active materials of the battery paste undergo chemical and physical changes that are used to establish the chemical and physical structure and subsequent mechanical strength necessary to form the battery plate. To produce typical battery plates, lead oxide, water and sulfuric acid are added to a commercial paste mixing machine and are then mixed to the desired consistency. Depending on whether negative or positive plates for the batteries are being produced, conventional additives such as a flock or expander may also be used to modify the properties of the paste and the performance of the plates produced. Other known additives may be used to improve the chemical and physical structure and performance of the battery plates.

The negative plates of lead-acid batteries are usually produced by preparing a paste with an expander mixture and then applying this battery paste to electrically conducting lead alloy structures known as grids to produce plates. Typically, these pasted plates are then cured in heated chambers containing air with a high relative humidity. This curing process produces the necessary chemical and physical structure required for subsequent handling and performance in the battery. Following curing, the plates are dried using any suitable means. After charging, these plates, comprising negative active material, are then suitable for use in a lead-acid battery.

The expander, which is usually a mixture of barium sulfate, carbon, and a lignosulfonate or other organic material, is normally added to the negative plate active material during preparation of the paste. The expander may also incorporate other known ingredients to improve the performance of the battery. The expander materials can be added separately to the paste during the paste mixing process, but an improved procedure is to mix the constituent materials of the expander before adding them to the paste mix.

The expander mixture performs a number of functions in the negative plate. For example, the barium sulfate acts as a nucleating agent for lead sulfate produced when the plate is discharged as follows:

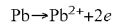

$$Pb \rightarrow Pb^{2+} + 2e$$

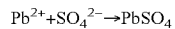

$$Pb^{2+} + SO_4^{2-} \rightarrow PbSO_4$$

The lead sulfate discharge product deposits on the barium sulfate particles assuring homogeneous distribution throughout the active material and preventing coating of the lead particles. The term barium sulfate represents both blanc fixe and barytes forms of this compound and mixtures thereof in particle sizes from 0.5 to 5 micrometers. It is desirable that the barium sulfate crystals have a very small particle size, of the order of 1 micron or less, so that a very large number of small seed crystals are implanted in the negative active material. This ensures that the lead sulfate crystals, which are growing on the barium sulfate nuclei, are small and of a uniform size so that they are easily converted to lead active material when the plate is charged as follows:

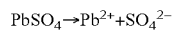

$$PbSO_4 \rightarrow Pb^{2+} + SO_4^{2-}$$

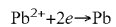

$$Pb^{2+} + 2e \rightarrow Pb$$

The function of the lignosulfonate is more complex. It is chemically adsorbed on the lead active material resulting in a significant increase in its surface area. Without lignosulfonate, the surface area is of the order of approximately 0.2 square meters per gram while, with 0.50% of lignosulfonate, this is increased to approximately 2 square meters per gram. This high surface area increases the efficiency of the electrochemical process which improves the performance of the negative plate. The lignosulfonate also stabilizes the physical structure of the negative active material, which retards degradation during operation of the battery. This property increases the life of the battery in service. The organic material can be any lignosulfonate compound or other suitable organic material that can be adsorbed on the surface of the negative active material and thereby affect its surface area and electrochemical behavior.

The carbon in the expander mixture increases the electrical conductivity of the active material in the discharged state, which improves its overall charge acceptance. In addition, carbon may facilitate the conversion of lead sulfate to lead during the charging process. The carbon is usually in the form of graphite, carbon black and/or activated carbon. The amount of carbon in conventional expander formulations is only a small fraction of a percent.

In the negative plate paste disclosed herein, at least part of at least two of the components defined by (a) the lead-based active material and (b) the carbon, (c) barium sulfate and (d) lignosulfonate of the expander mixture is present in the paste as composite particles. These composite particles can be individual particles or agglomerates, each containing two or more components of the battery paste, for example carbon particles coated with lead-based active material. More generally, however, the composite particles will be in the form of particles or agglomerates of one component of the paste adhered to particles or agglomerates of another component of the paste. In this respect, it is to be appreciated that the term "agglomerates" is used herein in its commonly accepted sense to refer to groups of primary particles or aggregates of these primary particles adhered together to produce larger clusters or "agglomerates".

Preferably, the composite particles comprise agglomerates of carbon particles having at least one of said (a) lead-based active material, (c) barium sulfate and (d) lignosulfonate associated therewith. Generally, the carbon particle agglomerates have an average particle size, $D_{50}$, of less than 200 microns, such as less than 100 microns, for example less than 30 microns, even less than 10 microns, and are composed of primary particles having an average size of about 10 to about 100 nm. Conveniently, the carbon particle agglomerates have a bimodal particle size distribution. Particle size measurements referred to herein are determined according to the following procedure.

Particle size analysis referred to herein are performed by the low angle scattering method using Microtrac X100. This technique utilizes Fraunhofer diffraction to analyze the particles in the range of 0.2 to 700 μm. The samples are prepared by adding approximately 10 mg of powder to a 1.5 dram glass vial. Three drops of Darvan C dispersant are added and the vial is filled with water. The sample is vortexed until it is fully mixed and allowed to sit for at least 10 minutes, then remixed. The sample is then added to a 250 ml re-circulating water bath and is run using the software auto-sequence. The auto-sequence includes a 10 second background check, a 30 second pre-run circulation and two 60 second analysis runs. The reported results are the average of the two 60 second runs.

In one embodiment, the composite particles comprise agglomerates of carbon particles having lead-based active material, especially lead oxide, lead sulfate or a mixture thereof, disposed between and on the surface of the carbon particle agglomerates. Conveniently, the weight ratio of carbon to the lead-based active material in the composite particles is from about 99:1 to about 80:20, such as from about 95:5 to about 90:10.

In a further embodiment, the composite particles comprise agglomerates of carbon particles having barium sulfate disposed between and on the surface of the carbon particle agglomerates. Conveniently, the weight ratio of carbon to barium sulfate in the composite particles is from about 90:10 to about 50:50, such as from about 80:20 to about 70:30.

In yet a further embodiment, the composite particles comprise agglomerates of carbon particles having lignosulfonate disposed between and on the surface of the carbon particle agglomerates. Conveniently, the weight ratio of carbon to lignosulfonate in the composite particles is from about 90:10 to about 50:50, such as from about 80:20 to about 60:40.

In another embodiment, the composite particles comprise agglomerates of carbon particles having at least two of said (a) lead-based active material, (c) barium sulfate and (d) lignosulfonate associated therewith.

In practice, some but not generally all of the expander mixture and especially the lead-based active phase is present in the negative battery paste as composite particles. However, irrespective whether added as composite particles or individual particles, the battery paste generally comprises about 0.2 wt % to about 10 wt % carbon, about 0.2 wt % to about 1 wt % barium sulfate and about 0.8 wt % to about 2 wt % lignosulfonate relative to the lead oxide in the paste.

The carbon employed in the composite particles described herein can be in any known form of particulate carbon, such as graphite, activated carbon and carbon black. Where carbon black is employed as the carbon source it may be desirable to initially pre-mix the carbon with water and subject the carbon black—water to pre-dispersion process including but not limited to blade mixing, high shear mixing, sonication, etc, to break down large agglomerates (greater than 30 microns) and thereby reduce the average particle size of the material to 5-10 microns, or even further to a sub-micron size.

In addition, prior to being used to produce the present composite particles, the carbon starting material may be modified to comprise surface organic groups comprising a) at least one aromatic group or a $C_1$ to $C_{12}$ alkyl group, and b) at least one ionic group and/or at least one ionizable group. Suitable ionic and/or ionizable groups include sulfate, sulfite, sulfonate and carboxylic acid groups. The production of such surface-modified carbon products is described in, for example, U.S. Pat. No. 5,885,335, the entire contents of which are incorporated herein by reference.

The use of the present composite particles, and in particular composite particles comprising crystalline lead-based active material adhered to agglomerates of carbon particles, has now been found to result in significant improvements in the performance of a negative lead-acid battery plate. For example, composite particles comprising very small (nm size) $PbO_2$ crystallites supported on high surface area carbon particles can reduce the size of the Pb particles produced on charging the plate and hence the $PbSO_4$ crystallites produced on discharging the plate. Once these small $PbSO_4$ crystallites are formed they should require shorter times to fully convert to Pb during charging cycles. In addition, since the crystallites are distributed on the surface of carbon support, their tendency to undergo sintering and aggregation will be reduced. The carbon support/active phase integrated particle will also enable the electrode to be provided with a pre-designed and stable porosity that can be preserved for large number of cycles. As a result, the carbon/active material composite particles should provide improved Pb phase utilization, leading to an increase in the energy and power density of the lead-acid battery along with improved cycleability The composite particles employed herein are desirably produced by spray conversion. In this embodiment, graphite, carbon black or activated carbon particles are conveniently dispersed in a first carrier liquid, such as water, and the resulting dispersion is mixed with a dispersion of particulate or chemical precursors of barium oxide and/or barium sulfate, lead oxide and/or lead sulfate, and/or a lignosulfonate in a second carrier liquid, such as water, miscible with the first carrier liquid.

The resultant mixture is then atomized to produce an aerosol comprising droplets of the mixture dispersed and suspended in a carrier gas. The droplets may be generated using any appropriate apparatus, including liquid atomizers, mist generators, nebulizers and aerosol generators. One suitable apparatus is an ultrasonic aerosol generator, in which ultrasonic energy is used to form or assist formation of the droplets. An example of an ultrasonic aerosol generator is a nozzle-type apparatus, with the nozzle being ultrasonically energized to aid in formation of droplets of a fine size and narrow size distribution. Another example of an ultrasonic aerosol generator ultrasonically energizes a reservoir of the precursor mixture, causing atomization cones to develop, from which droplets of the precursor mixture form, and are swept away by a flowing carrier gas. Reservoir-type ultrasonic aerosol generators can produce very small droplets of a relatively narrow size distribution and are preferred for use in applications when the final composite particles are desired to be in a range of from about 0.2 to about 5 microns (weight average particle size), and especially when a narrow size distribution of the particles is desired. An example of a reservoir-type ultrasonic aerosol generator is described, for example, in U.S. Pat. No. 6,338,809, the entire contents of which are incorporated by reference herein. Although both the nozzle-type ultrasonic aerosol generator and the reservoir-type ultrasonic aerosol generator produce small droplets of a relatively narrow size distribution, the reservoir-type generally produces finer droplets of a more uniform size.

Another example of an apparatus for generating droplets is a spray nozzle (not ultrasonically energized). Some examples of spray nozzles include 2-fluid nozzles, gas nozzles and liquid nozzles. Spray nozzle generators have an advantage of very high throughput compared to ultrasonic generators. Droplets produced using spray nozzles, however, tend to be much larger and to have a much wider size distribution than droplets produced by ultrasonic generators. Therefore, spray nozzles are preferred for making relatively large composite particles. Other types of droplet generators that may be used include rotary atomizers, and droplet generators that use expansion of a supercritical fluid or high pressure dissolved gas to provide the energy for droplet formation. Still another process for generating droplets is disclosed in U.S. Pat. No. 6,601,776, the entire contents of which are incorporated herein by reference.

The carrier gas used as the transport medium for the aerosol may be any convenient gas composition and may, for example, be a single component gas composition (such as for example pure nitrogen) or a mixture of multiple gas components (such as for example air, or a mixture of nitrogen and hydrogen). In addition, the carrier gas can be selected so as to be substantially non-reactive during the spray conversion process or alternatively may be selected so as to participate in, for example, the conversion of the silica precursor compound to silica during the spray conversion process.

After the aerosol is generated, the aerosol is heated in order to remove at least a portion of the liquid vehicle in the droplets and produce the desired composite particles. Typically these processes are accomplished in a single step by heating the aerosol to a reaction temperature of not greater than 600° C., such as not greater than 500° C. (e.g., from about 300° C. to about 450° C. or from about 350° C. to about 200° C.) for a period of time of at least about 1 seconds, e.g., at least 3 second, at least about 20 seconds or at least about 100 seconds. Conveniently, the heating is conducted in a spray dryer, since spray dryers have the advantage of having high throughput, which allows large amounts of particles to be produced with various particle size distributions.

In some cases, it may be desirable to include in the carbon/active phase composite particles described herein one or more other components of the expander mixture of the lead-acid battery negative electrode, such as one or both of the barium sulfate and the lignosulfonate. This can be achieved simultaneously with, or separately from, the production of the carbon/active phase composite particles. For example, using the spray conversion technique described above, barium sulfate crystals can be added to an aqueous dispersion of carbon black and lead sulphate crystals. Spray drying then results in spherical composite micron size agglomerate particles of carbon, lead sulphate and barium sulfate and having fixed porosity. Alternatively, carbon/active phase composite particles can be produced in an initial spraying drying operation and the resultant particles co-dispersed in water with barium sulfate crystals and/or lignosulfonate polymer. Spray drying to the co-dispersion again results in spherical composite micron size agglomerate particles of carbon, lead-based active phase, barium sulfate and/or lignosulfonate with fixed porosity.

In another embodiment, carbon agglomerates and lead sulfate crystals can be dispersed in solvent and a soluble precursor to barium sulfate or barium oxide can be added to the precursor solution and the resultant mixture sprayed to form agglomerate composite particle where small barium sulfate or oxide nanoparticles are preferentially deposited onto the surface of the carbon/lead sulfate composite particles.

In yet another embodiment, a lignosulfonate polymer can be dissolved in water and co-sprayed together with a dispersion of the other components (carbon and lead-based active phase) to form modified carbon silica composite particles.

In addition, any of the above powders, but in particular carbon/active phase composite particles (powders), can be pre mixed with barium sulfate and or lignosulfonate and pelletized by dry and wet pelletization processes to form 50 to 300 microns size pellets which are then easily and uniformly dispersed when the pellets are added to the negative battery paste formulation. In particular, some of the composite particles used herein can be made by the commonly known wet pelletization techniques, where aqueous dispersions of carbon, lignosulfonate and barium sulfate are processed by high shear pin pelletizers and dried using conventional carbon black dryers such as rotary dryers or fluidized bed dryers.

The invention will now be more particularly described with reference to the Examples and the accompanying drawings.

EXAMPLE 1

Sprayed Dried Carbon Black 2000 g of a carbon black suspension (10 wt. % solids loading in water) is mixed with additional 3000 g water to produce a mixture with a pH of about 8.9. The combined mixture is sheared for 15-20 minutes until the components are intimately mixed. The feed is then pumped to an atomization unit to form droplets and the droplets are entrained in a gas stream and sprayed into spray conversion equipment such as a spray dryer. The spray dryer is operated with an inlet temperature of 550° C. and an outlet temperature of 300° C.

Figure 2A:
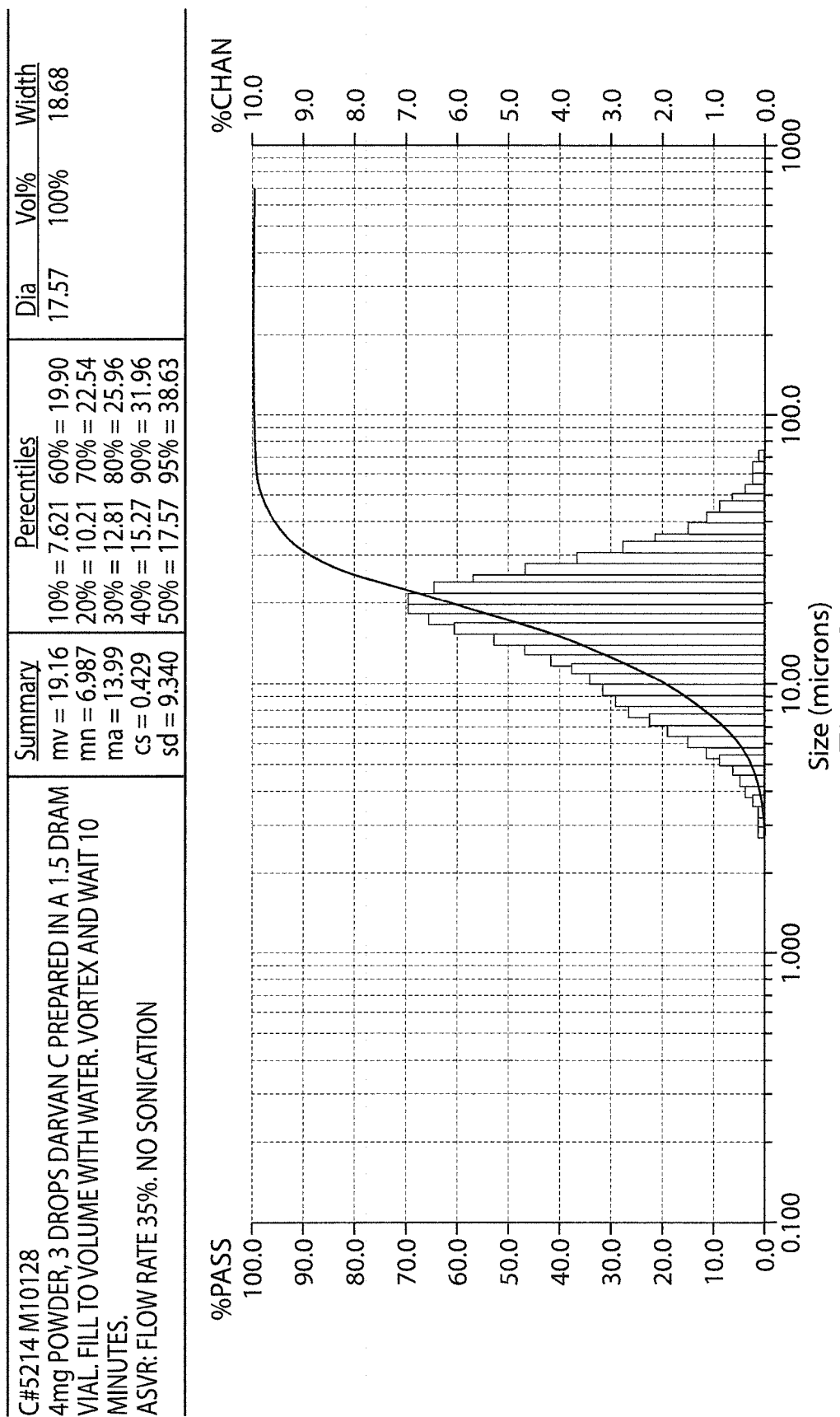
FIGS. 2(a) and (b) are a particle size distribution graph and SEM (at a magnification of 500×) of the carbon black sample of Example 1 ($D_{50}$=17.6 microns).
Figure 2B:
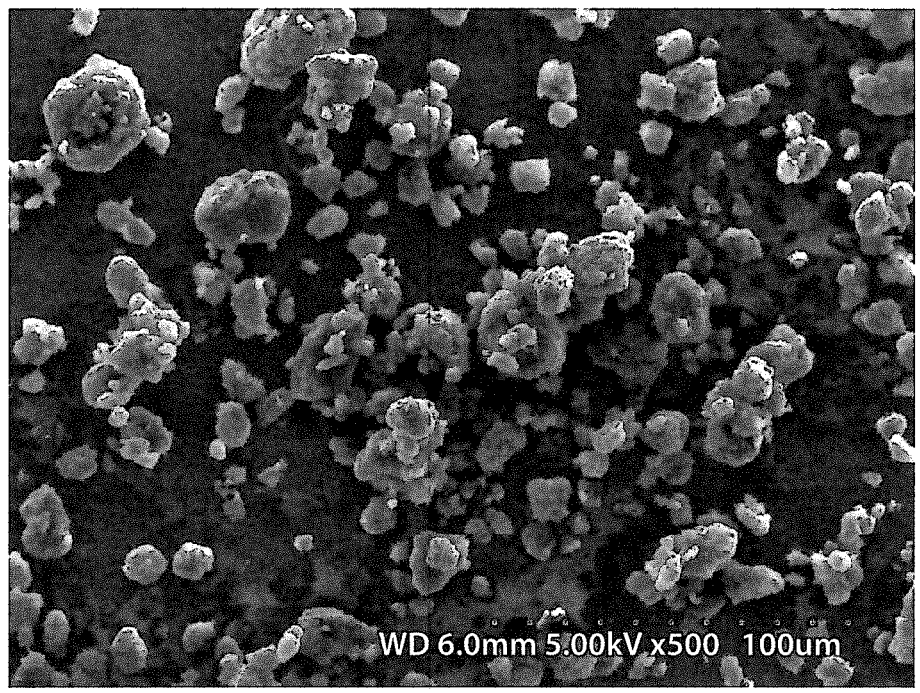
Figure 3A:
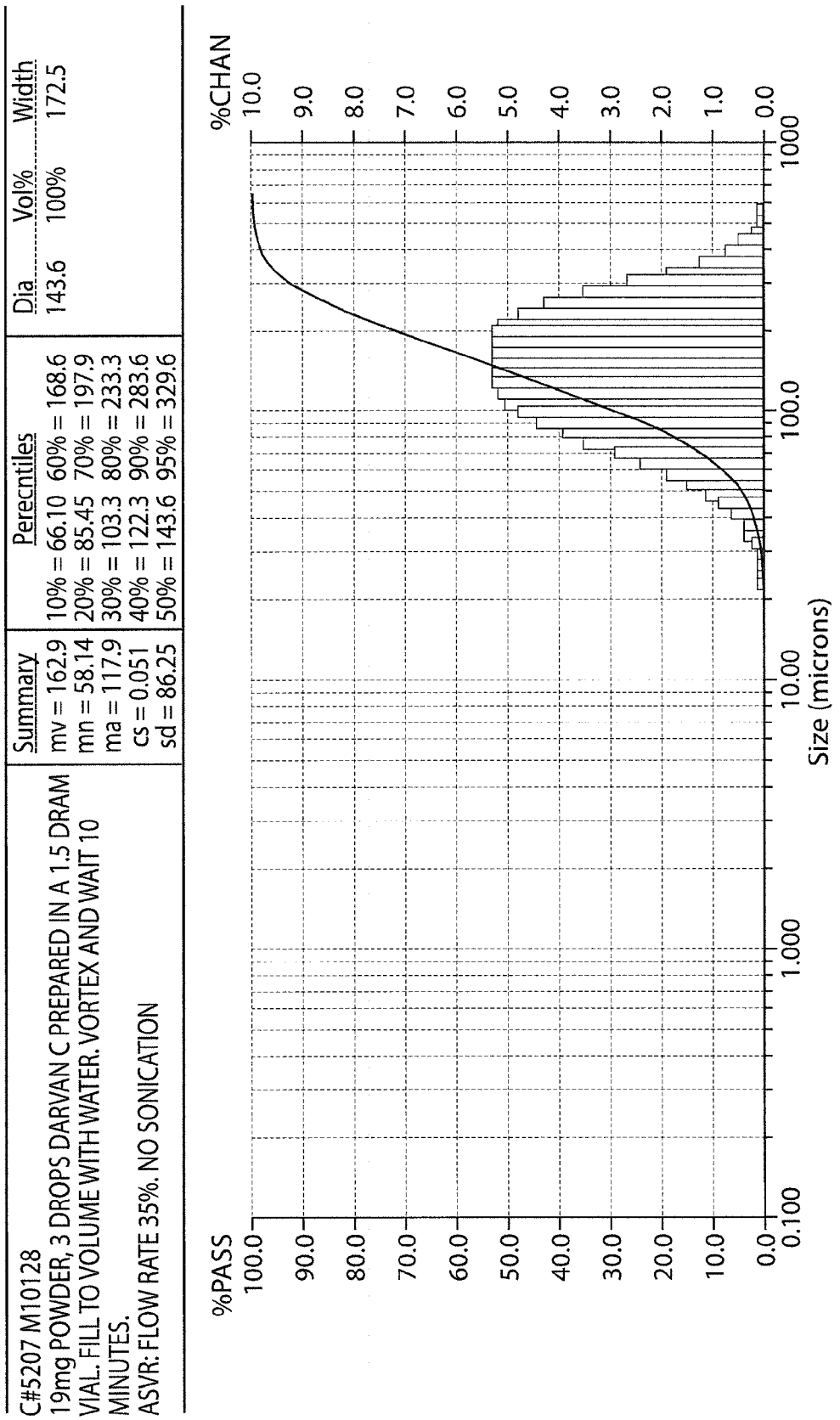
FIGS. 3(a) and (b) are a particle size distribution graph and SEM (at a magnification of 100×) of the carbon black sample of Example 1 ($D_{50}$=144 microns).
Figure 3B:
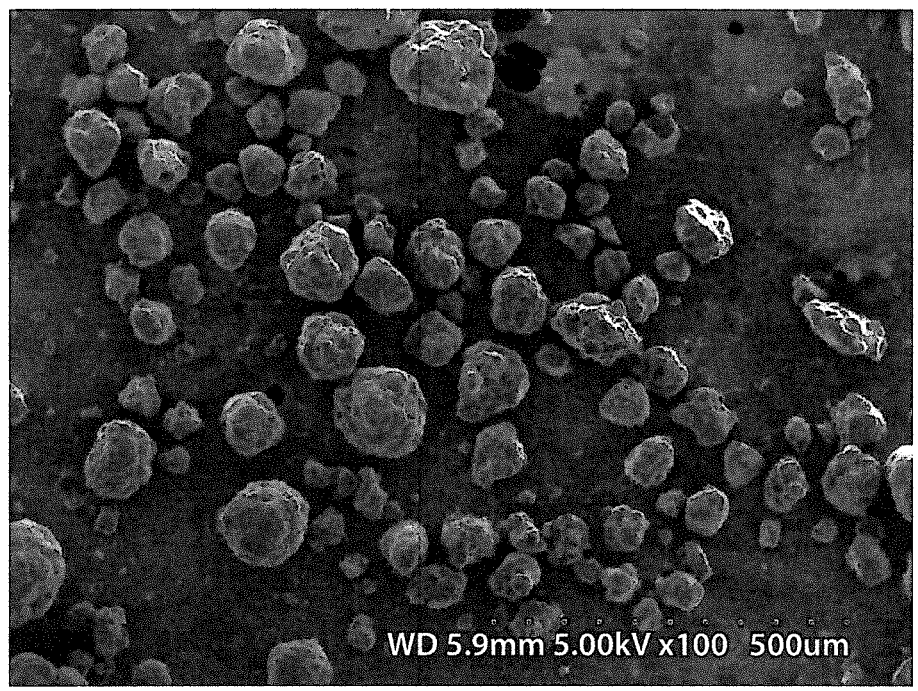
Figure 4:
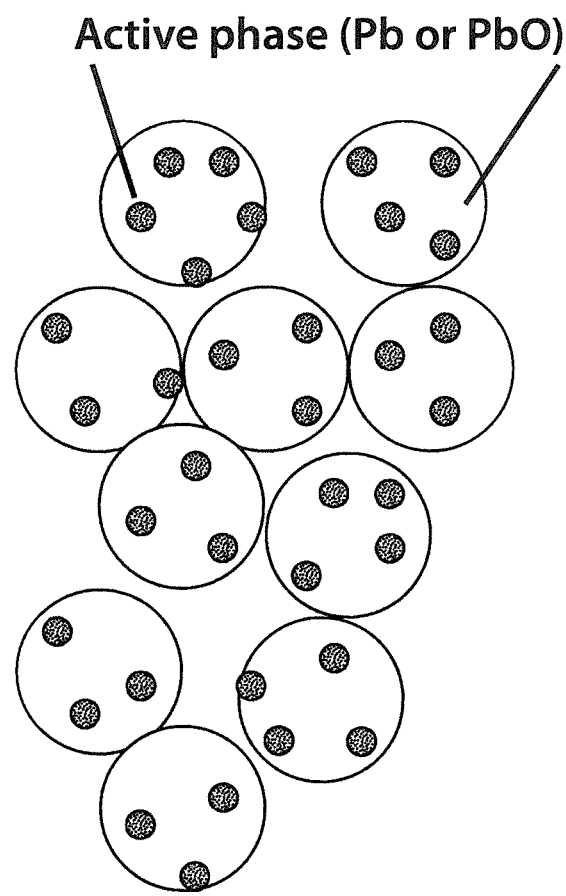
FIG. 4 shows a schematic view of the composite carbon/lead oxide particles of Example 4.

The particle size distributions and SEM images of carbon black agglomerates produced according to Example 1 are shown in FIG. 1 ($D_{50}$=7.1 microns), FIG. 2 ($D_{50}$=17.5 microns) and FIG. 3 ($D_{50}$=144 microns).

Variation in the particles size of the carbon agglomerates can be achieved by selection of spray dryer (size, design and operating parameters) equipped with appropriate atomization unit type such as rotary atomizer, multi fluid nozzles or pressure spray that generate droplet sizes corresponding to the targeted carbon agglomerate size and distribution.

EXAMPLE 2

Sprayed Dried Carbon Black/Lignosulfonate Composite (90:10 by Weight)

10 g of lignosulfonate is added to 90 g of carbon black and 500 g of water in a high shear mixer. The resulting mixture is processed to disperse carbon black using ligonosulfonate as dispersing agent and 1660 g of additional water is added to make dispersion with 4 wt % carbon black. The mixture is then pumped to an atomization unit to form droplets and the droplets are entrained in a gas stream and sprayed into spray conversion equipment such as a spray dryer. The spray dryer is operated with temperature high enough to evaporate water and low enough to avoid thermal decomposition of ligonosulfonate. A representative inlet temperature could be between 200-250° C. The spray drying produces composite particles of carbon black/lignosulfonate (90:10 by weight).

EXAMPLE 3

Sprayed Dried Carbon Black/Barium Sulfate Composite (75:25 by Weight)

Barium sulfate nanoparticles are prepared according to the teaching of Chemical Engineering Journal 149 (2009) 473-478. 100 g barium sulfate suspension (10 wt % barium sulfate) is mixed with 300 g carbon black suspension (10 wt % carbon) and 600 g water. The combined mixture is sheared for 15-20 minutes until the components are intimately mixed. The feed is then pumped to an atomization unit to form droplets and the droplets are entrained in a gas stream and sprayed into spray conversion equipment such as a spray dryer. The spray dryer is operated with an inlet temperature of 550° C. and an outlet temperature of 300° C. to produce composite particles of carbon black/barium sulfate (75:25 by weight).

EXAMPLE 4

Sprayed Dried Carbon Black/Lead Oxide (90:10 by Weight)

14.8 g lead nitrate is mixed with 900 g carbon black suspension (10 wt % carbon) and 1585.2 g water. The combined mixture is sheared for 15-20 minutes until the components are intimately mixed. The feed is then pumped to an atomization unit to form droplets and the droplets are entrained in a gas stream and sprayed into spray conversion equipment such as a spray dryer. The spray dryer is operated with an inlet temperature of 550° C. and an outlet temperature of 300° C. to produce composite particles of carbon black/lead oxide (90:10 by weight).

EXAMPLE 5

Sprayed Dried Carbon Black/Barium Sulfate/Lignosulfonate Composite (70:20:10 by Weight)

Barium sulfate nanoparticles are prepared according to the teaching of Chemical Engineering Journal 149 (2009) 473-478. 10 g of lignosulfonate is added to 70 g of high surface area carbon black in a high shear mixer containing some water. The resulting mixture is processed to disperse carbon black using lignosulfonate as dispersing agent and additional water is added to make up 4 wt % solid (carbon black plus lignosulfonate) in the dispersion. 2000 g of suspension containing carbon black and lignosulfonate is then mixed with 200 g barium sulfate suspension (10 wt % barium sulfate) and 300 g water. The combined mixture is sheared for 15-20 minutes until the components are intimately mixed. The mixture is then pumped to an atomization unit to form droplets and the droplets are entrained in a gas stream and sprayed into spray conversion equipment such as a spray dryer. The spray dryer is operated at inlet temperature of 200° C. to produce composite particles of carbon black/barium sulfate/lignosulfonate (70:20:10 by weight).

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

The invention claimed is:

1. A paste suitable for a negative plate of a lead-acid battery, the paste comprising a lead-based active material, barium sulfate, a lignosulfonate, and composite particles comprising agglomerates of carbon particles, wherein the agglomerates of carbon particles have at least part of the lead-based active material disposed between and on the surface of said carbon particle agglomerates, and the weight ratio of carbon to said lead-based active material in the composite particles is from about 99:1 to about 80:20.

2. The paste of claim 1, wherein said agglomerates of carbon particles comprise carbon black.

3. The paste of claim 1, wherein said agglomerates of carbon particles have an average particle size, $D_{50}$, of less than 200 microns.

4. The paste of claim 1, wherein said lead-based active material comprises a lead oxide, lead sulfate or a mixture thereof.

5. The paste of claim 1, wherein the composite particles comprise agglomerates of carbon particles having at least part of said barium sulfate disposed between and on the surface of said carbon particle agglomerates.

6. The paste of claim 5, wherein the weight ratio of carbon to barium sulfate in the composite particles is from about 90:10 to about 50:50.

7. The paste of claim 1, wherein the composite particles comprise agglomerates of carbon particles having at least part of said lignosulfonate disposed between and on the surface of said carbon particle agglomerates.

8. The paste of claim 7, wherein the weight ratio of carbon to lignosulfonate in the composite particles is from about 90:10 to about 50:50.

9. A negative plate for a lead-acid battery produced from the paste of claim 1.

10. A lead-acid battery comprising a negative plate produced from the paste of claim 1.

11. The paste of claim 1, wherein said carbon particle agglomerates have an average particle size, $D_{50}$, of less than 100 microns.

12. The paste of claim 1, wherein said carbon particle agglomerates have an average particle size, $D_{50}$, of less than 30 microns.

13. The paste of claim 1, wherein the composite particles further comprise the lead-based active material.

14. A lead-acid battery comprising a negative plate produced from the paste of claim 13.

15. The paste of claim 1, comprising lead oxide, and 0.2 wt % to 1 wt % barium sulfate relative to the lead oxide.

* * * * *